J. E. SHEARER.
FRICTION CLUTCH.
APPLICATION FILED JULY 25, 1908.

923,900.

Patented June 8, 1909.
2 SHEETS—SHEET 1.

WITNESSES.
Arthur L. Slew.
A. Dixon.

INVENTOR.
Joe E. Shearer
by Spear & Seely
ATTYS.

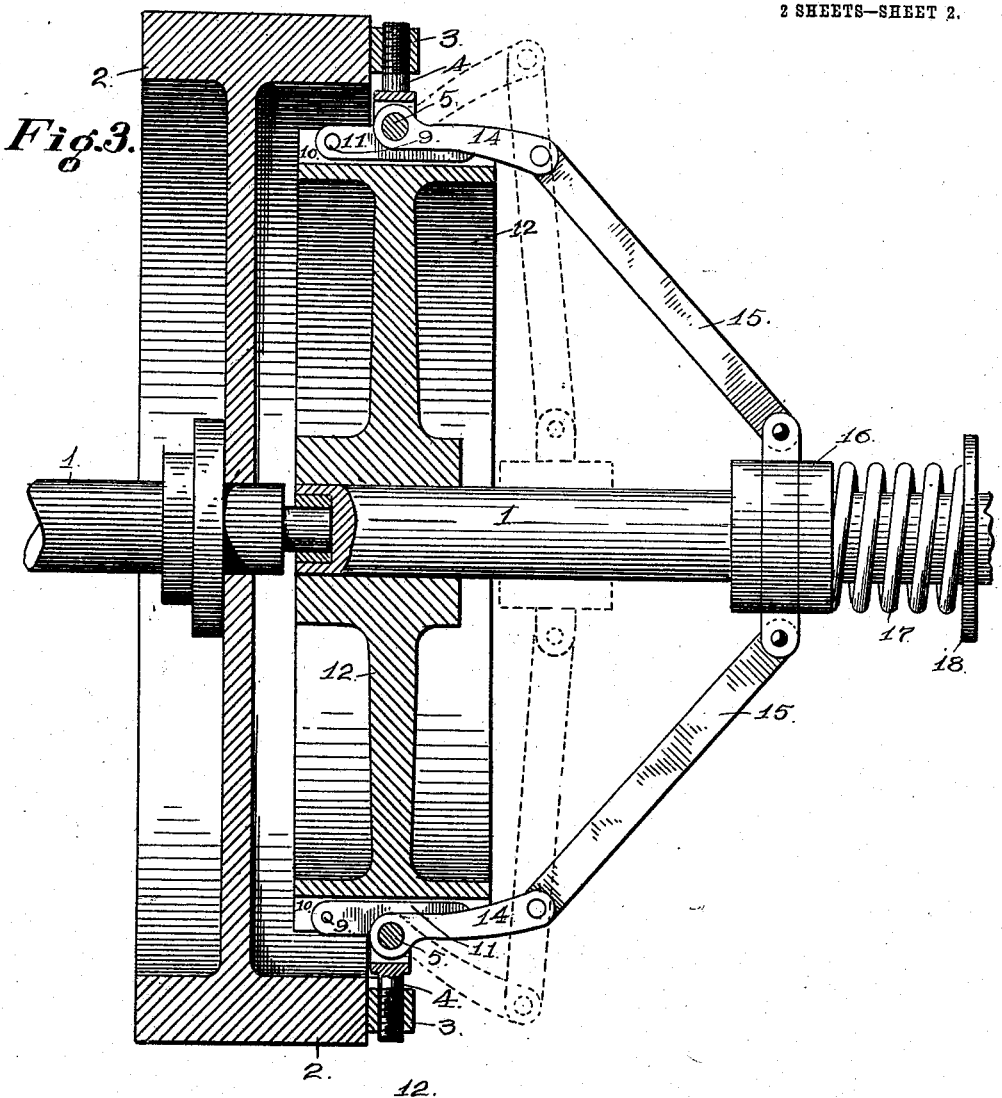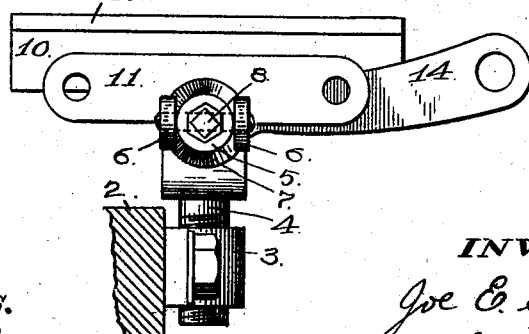

UNITED STATES PATENT OFFICE.

JOE E. SHEARER, OF SAN FRANCISCO, CALIFORNIA, ASSIGNOR TO CALIFORNIA CLUTCH CO., OF SAN FRANCISCO, CALIFORNIA, A CORPORATION OF CALIFORNIA.

FRICTION-CLUTCH.

No. 923,900.      Specification of Letters Patent.      Patented June 8, 1909.

Application filed July 25, 1908. Serial No. 445,373.

*To all whom it may concern:*

Be it known that I, JOE E. SHEARER, a citizen of the United States, residing at San Francisco, in the county of San Francisco, State of California, have invented new and useful Improvements in Friction-Clutches, of which the following is a specification.

My invention relates to improvements in friction clutches and the object of the invention is to provide a friction clutch which will be simple of construction; which will operate efficiently and reliably, and which may be produced at low cost.

My invention includes the features of construction and arrangement and combination of parts hereinafter described and more particularly set forth in the appended claims.

Figure 1:
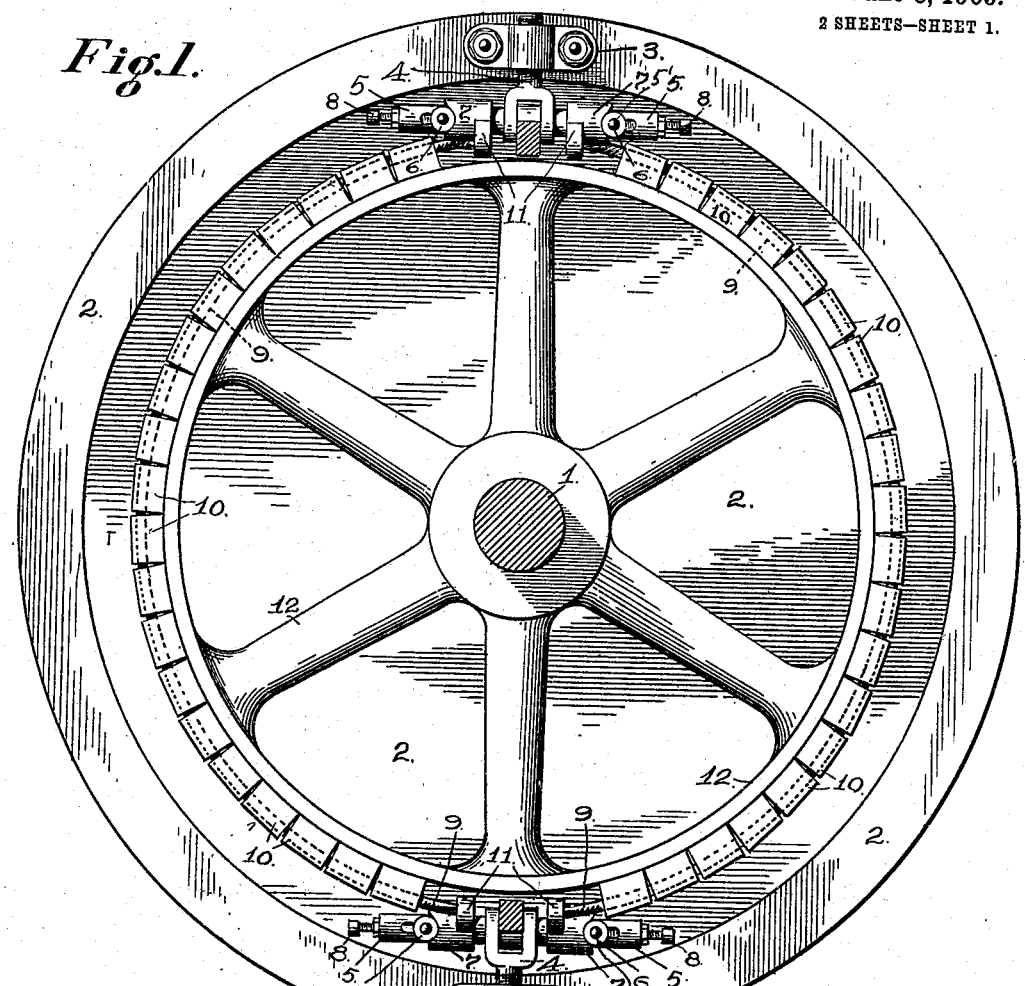
Figure 2:
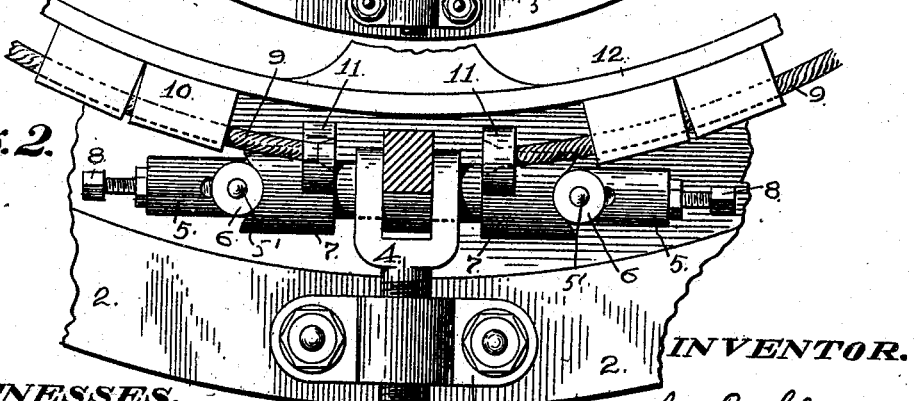

The accompanying drawings, which form a part of this specification, illustrate a friction clutch constructed in accordance with my invention, and in which:

Figure 1, is a front view of the clutch; Fig. 2, is a detail of the operating mechanism on an enlarged scale; Fig. 3, is a vertical section of that shown in Fig. 1, and Fig. 4, is a side elevation of that shown in Fig. 2.

Referring more particularly to the drawings, the numeral 1 is a central shaft having an operating wheel 2 properly mounted thereon. On the rim of the operating wheel 2, and suitably mounted are the dolly-boxes 3, in which are fastened the yokes 4 by means of their screw ends, as shown, or by any other suitable means. The said yokes 4 form supports for the tension rods 5. As these tension rods and their connecting operating mechanism are similar in construction a description of one of them will suffice. In slots on each tension rod, as shown, are bars 5' with bearings projecting beyond the sides of said rods on which are mounted the rollers or wheels 6. The said bars with their bearings, and rollers or wheels, are adjustable in the slots in the tension rods by means of the set screws 8. The double cam sleeves 7 are slidably mounted on the tension rod 5, and at 11 are provided yokes or terminals for the cables 9, said cables carrying the friction blocks 10, of fiber or some suitable material. These blocks engage the periphery of the pulley 12.

The levers 14, as shown in Fig. 3 and Fig. 4, are secured on the tension shaft 5 and connected by means of the links 15 to the sliding collar 16, against which is exerted the pressure of the spring 17, having a disk 18 for its support.

When the collar 16 is moved toward the fly wheel 2 the levers 14 are forced outward by means of the links 15 turning the tension shafts 5. These in turn cause the rollers or wheels 6 to act on the faces of the double cam sleeves 7 and draw together the cable yokes 11 mounted thereon. The cables, on which are the friction blocks 10, are forced to assume a smaller circumference and so grip the pulley 12, causing the same to revolve with the operating wheel 2. When the collar 16 resumes the position away from the operating wheel, the levers 14 are drawn inward by the links 15. This causes the depressions in the surfaces of the double cam sleeves to register with the rollers, thus removing the tension before brought on the cables and so releasing the friction of the friction blocks on the periphery of the pulley 12.

Having thus described my invention what I claim as new and desire to secure by Letters Patent is:—

1. A friction clutch comprising a driving member and a driven member, a rod carried by the driving member, sleeves slidably mounted on said rod, said sleeves each having a cam shaped end, a contractible member having its ends carried by said sleeves, rollers carried by the rod and engaging with the cam shaped ends of the sleeves, means for adjusting the position of the rollers so as to move the sleeves relatively to each other so as to adjust the contractible member in relation to the driven member, and means for rotating the rod to contract and expand the contractible member.

2. In a friction clutch, the combination with a driving and a driven shaft, a cup-shaped member secured to the driving shaft and having semi-circular contractible members thereon, a circular member on the driven shaft within said contractible members, a sleeve on the driven shaft slidable longitudinally thereon and rotating with the driving shaft, double cams adapted to be operated by longitudinal movements of said sleeve, said cams in their operation adapted to draw together and contract said contractible members as desired in engagement with said circular member on the driven shaft, substantially as described.

In testimony whereof I have affixed my signature in the presence of two witnesses this 15th day of July 1908.

JOE E. SHEARER.

Witnesses:
FRANK L. OWEN,
A. DIXON.